United States Patent
Kodama et al.

(10) Patent No.: US 9,042,885 B2
(45) Date of Patent: May 26, 2015

(54) WIRELESS COMMUNICATION APPARATUS AND SCAN CONTROL METHOD

(75) Inventors: Takeshi Kodama, Yokohama (JP); Tetsumei Tsuruoka, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 486 days.

(21) Appl. No.: 13/420,758

(22) Filed: Mar. 15, 2012

(65) Prior Publication Data
US 2012/0238274 A1 Sep. 20, 2012

(30) Foreign Application Priority Data
Mar. 18, 2011 (JP) ................................. 2011-061538

(51) Int. Cl.
*H04W 4/00* (2009.01)
*H04W 36/00* (2009.01)

(52) U.S. Cl.
CPC ................................. *H04W 36/0083* (2013.01)

(58) Field of Classification Search
CPC ............ H04W 48/12; H04W 36/0083; H04W 36/0088; H04W 48/16; H04W 48/18; H04W 48/20; H04W 36/0094
See application file for complete search history.

(56) References Cited

U.S. PATENT DOCUMENTS

| 6,064,890 A | 5/2000 | Hirose et al. |
| 8,121,596 B1 * | 2/2012 | Shetty et al. ................... 455/434 |
| 2008/0119192 A1 | 5/2008 | Miyata |

FOREIGN PATENT DOCUMENTS

| JP | 10-191419 | 7/1998 |
| JP | 2007-116561 | 5/2007 |
| JP | 2008-131069 | 6/2008 |
| JP | 2010-28665 | 2/2010 |
| JP | 2010-081437 | 4/2010 |

OTHER PUBLICATIONS

Office Action of Japanese Patent Application No. 2011-061538 dated Jul. 1, 2014 with Partial Translation.

* cited by examiner

*Primary Examiner* — German J Viana Di Prisco
(74) *Attorney, Agent, or Firm* — Katten Muchin Rosenman LLP (57) ABSTRACT

A wireless communication apparatus including a wireless communication interface configured to receive radio waves, and a processor configured to measure radio-wave qualities of the radio waves from a plurality of base stations in a periodic measurement period, to divide one measurement period out of the periodic measurement period, and to measure radio-wave qualities of the corresponding measurement-target base stations, to determine a base station to be excluded from the measurement-target base stations in a next measurement period in the periodic measurement period on the basis of the radio-wave qualities, and to allocate the measurement time period that has been allocated to the base station to be excluded in a measurement period to a measurement-target base station in the next measurement period.

11 Claims, 11 Drawing Sheets

| ADJACENT BASE STATION IDENTIFIER | CENTER FREQUENCY (GHz) | RADIO-WAVE QUALITY (dBm) | ACCUMULATED MEASUREMENT TIME (ms) | CONTINUOUS NON-MEASUREMENT TIME (ms) | NUMBER OF MEASUREMENTS (TIMES) |
|---|---|---|---|---|---|
| ADJACENT BASE STATION 31 | 2.51 | — | — | — | — |
| ADJACENT BASE STATION 32 | 2.52 | — | — | — | — |
| ADJACENT BASE STATION 33 | 2.53 | — | — | — | — |
| ADJACENT BASE STATION 34 | 2.54 | — | — | — | — |

| ADJACENT BASE STATION IDENTIFIER | CENTER FREQUENCY (GHz) | RADIO-WAVE QUALITY (dBm) | ACCUMULATED MEASUREMENT TIME (ms) | CONTINUOUS NON-MEASUREMENT TIME (ms) | NUMBER OF MEASUREMENTS (TIMES) |
|---|---|---|---|---|---|
| ADJACENT BASE STATION 31 | 2.51 | 20 | 20 | 0 | 1 |
| ADJACENT BASE STATION 32 | 2.52 | 12 | 20 | 0 | 1 |
| ADJACENT BASE STATION 33 | 2.53 | 3 | 20 | 0 | 1 |
| ADJACENT BASE STATION 34 | 2.54 | 0 | 20 | 0 | 1 |

| ADJACENT BASE STATION IDENTIFIER | MEASUREMENT ERROR WIDTH (dBm) | MEASUREMENT ERROR (dBm) |
|---|---|---|
| ADJACENT BASE STATION 31 | 11 | 9~31 |
| ADJACENT BASE STATION 32 | 11 | 1~23 |
| ADJACENT BASE STATION 33 | 11 | -8~14 |
| ADJACENT BASE STATION 34 | 11 | -11~11 |

| ADJACENT BASE STATION IDENTIFIER | CENTER FREQUENCY (GHz) | RADIO-WAVE QUALITY (dBm) | ACCUMULATED MEASUREMENT TIME (ms) | CONTINUOUS NON-MEASUREMENT TIME (ms) | NUMBER OF MEASUREMENTS (TIMES) |
|---|---|---|---|---|---|
| ADJACENT BASE STATION 31 | 2.51 | 20 | 220 | 0 | 5 |
| ADJACENT BASE STATION 32 | 2.52 | 12 | 140 | 0 | 5 |
| ADJACENT BASE STATION 33 | 2.53 | 3 | 20 | 320 | 1 |
| ADJACENT BASE STATION 34 | 2.54 | 0 | 20 | 320 | 1 |

| ADJACENT BASE STATION IDENTIFIER | CENTER FREQUENCY (GHz) | RADIO-WAVE QUALITY (dBm) | ACCUMULATED MEASUREMENT TIME (ms) | CONTINUOUS NON-MEASUREMENT TIME (ms) | NUMBER OF MEASUREMENTS (TIMES) |
|---|---|---|---|---|---|
| ADJACENT BASE STATION 31 | 2.51 | 40 | 220 | 0 | 5 |
| ADJACENT BASE STATION 32 | 2.52 | 24 | 180 | 0 | 5 |
| ADJACENT BASE STATION 33 | 2.53 | 3 | 20 | 320 | 1 |
| ADJACENT BASE STATION 34 | 2.54 | 0 | 20 | 320 | 1 |

WIRELESS COMMUNICATION APPARATUS AND SCAN CONTROL METHOD

CROSS-REFERENCE TO RELATED APPLICATION

This application is based upon and claims the benefit of priority of the prior Japanese Patent Application No. 2011-61538, filed on Mar. 18, 2011, the entire contents of which are incorporated herein by reference.

FIELD

The embodiment discussed herein is related to a wireless communication apparatus performing wireless communication and control method thereof.

BACKGROUND

When a wireless communication terminal such as a mobile phone is performing communication, if the terminal moves to an area where radio waves of the currently serving base station may not reach, the communication may be disconnected. Accordingly, the wireless communication terminal switches, in the course of movement, the currently serving base station to a communication destination station to continue the communication. Switching of base stations, to which the wireless communication terminal is connected, in this manner is called a "handover".

In order to carry out this handover, the wireless communication terminal measures qualities of radio-waves coming from adjacent base stations located in a neighboring area to the currently serving base station, and selects a target base station to be connected (in the following, the measurement operation of radio-wave qualities is also called a "scan").

As a result of the scan, the wireless communication terminal determines a base station providing the highest radio-wave quality among the adjacent base stations, and performs a handover with the determined target base station.

As a related-art technique, a proposal has been made that if there is an unsuitable base station among a plurality of base stations that are connection candidates, a selection priority of that base station is decreased. Also, a technique has been proposed in which when a frequency band available for using a communication service is searched, a frequency not to be a carrier frequency is skipped in order to be excluded from the search targets.

The related-art techniques have been disclosed in Japanese Laid-open Patent Publication Nos. 2010-28665 and 2007-116561.

SUMMARY

According to an aspect of the invention, a wireless communication apparatus including a wireless communication interface configured to receive radio waves, and a processor configured to measure radio-wave qualities of the radio waves from a plurality of base stations in a periodic measurement period, to divide one measurement period out of the periodic measurement period, and to measure radio-wave qualities of the corresponding measurement-target base stations, to determine a base station to be excluded from the measurement-target base stations in a next measurement period in the periodic measurement period on the basis of the radio-wave qualities, and to allocate the measurement time period that has been allocated to the base station to be excluded in a measurement period to a measurement-target base station in the next measurement period.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In order to increase scan precision (reliability), a wireless communication terminal performs scanning repeatedly in a certain period, and determines a target base station not on the basis of an instantaneous value, but on the basis of an evaluation value based on the repeated scan.

For example, in WiMAX (Worldwide Interoperability for Microwave Access), a serving base station specifies a period of performing scanning repeatedly. The wireless communication terminal performs scanning on adjacent base stations in the specified period to obtain evaluation values, and determines a target base station on the basis of the evaluation values.

The longer the scanning period is, the higher becomes precision (reliability) of the evaluation value, and thus more adequately the wireless communication terminal is allowed to determine whether to execute a handover or not, and to select a target base station.

However, while the scanning is performed, communication with the serving base station is suspended. Accordingly, there has been a problem in that the longer the scanning period becomes, the lower becomes a communication throughput between the wireless communication terminal and the serving base station.

In particular, in a situation having a large number of adjacent base stations, the scanning is repeatedly performed until the scanning on all the adjacent base stations is complete. Then, time for the scanning period also increases, and thus the communication throughput decreases conspicuously.

The present disclosure has been made in view of these points. It is an object of the present disclosure to provide a wireless communication apparatus that performs high-precision scan in a short time, and has an improved communication quality.

Figure 1:
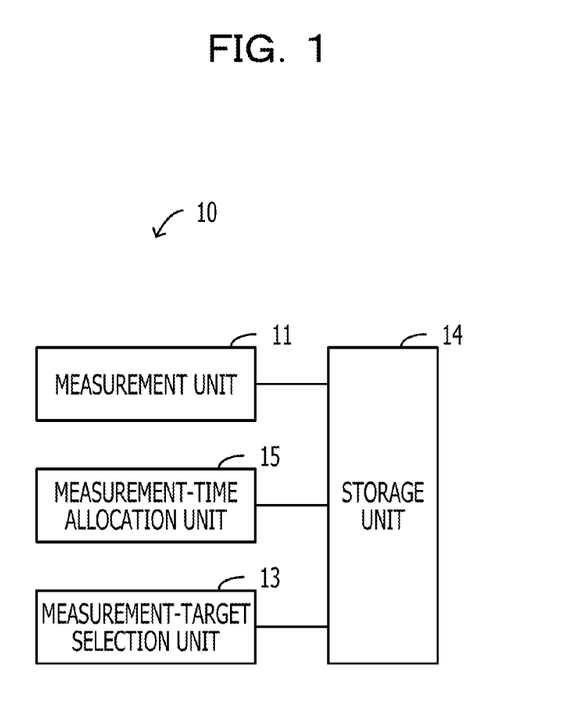
FIG. 1 is a diagram illustrating a configuration of a wireless communication apparatus.

In the following, descriptions will be given of embodiments of the present disclosure with reference to the drawings. FIG. 1 is a diagram illustrating a configuration of a wireless communication apparatus. The wireless communication apparatus 10 includes a measurement unit 11, a measurement-target selection unit 13, a storage unit 14, and a measurement-time allocation unit 15.

The measurement unit 11 divides one measurement period out of a periodic measurement period, and measures a radio-wave quality of each measurement-target base station. The measurement-target selection unit 13 determines a base station to be excluded from the measurement in the measurement period next to the one measurement period from the measurement-target base stations on the basis of the radio-wave qualities.

The storage unit 14 stores and manages information, such as a measurement result of a radio-wave quality and a measurement time, etc., obtained by the measurement unit 11 for each measurement-target base station. The measurement-time allocation unit 15 allocates a measurement time that has been allocated to the base station to be excluded from the measurement in one measurement period to the measurement-target base stations other than the base station excluded from the measurement in the next measurement period.

Figure 2:
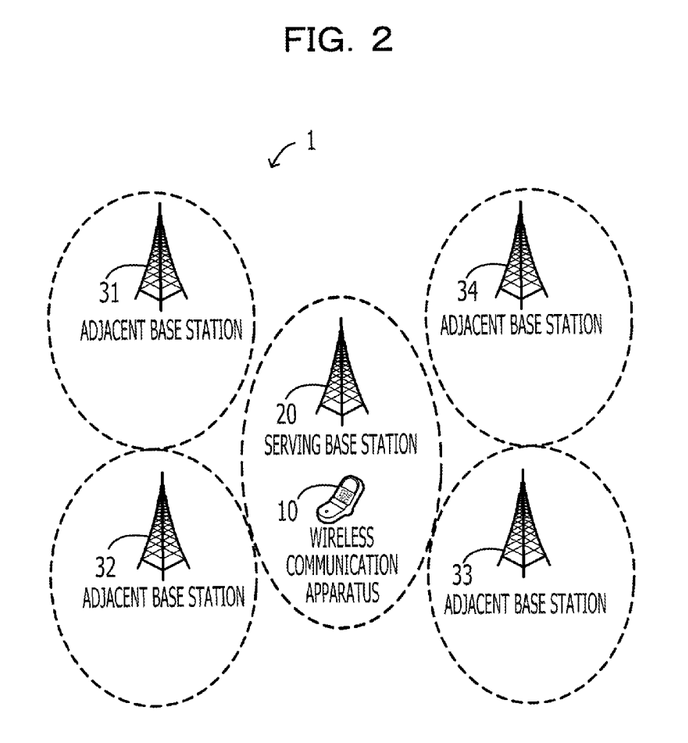
FIG. 2 is a diagram illustrating a configuration of a network.

FIG. 2 is a diagram illustrating a configuration of a network. A network 1 is an example of a network topology to which the wireless communication apparatus 10 is applied. The network 1 includes a wireless communication apparatus 10, a serving base station 20 to which the wireless communication apparatus 10 belongs, and adjacent base stations 31 to 34, which are adjacent to the serving base station 20.

Next, a description will be given of pre-adjustment performed between the wireless communication apparatus 10 and the serving base station 20 before starting a scan. The wireless communication apparatus 10 performs negotiation with the serving base station 20 at the time of starting a scan to obtain and store various kinds of information.

For example, from the serving base station 20 with which the wireless communication apparatus 10 is currently communicating, the wireless communication apparatus 10 obtains information on the fact that there are adjacent base stations 31 to 34 in a surrounding area of the serving base station 20, center frequencies, etc., of the adjacent base stations 31 to 34 in advance and stores the information.

Also, the wireless communication apparatus 10 obtains a scan-period condition (measurement guarantee period) guaranteeing precision (reliability) of a scan result from the serving base station 20. The scan-period condition indicates a minimum scan period for one of the adjacent base stations, and allows a highly-reliable measurement result to be obtained if scanning is performed using at least that scan period.

Here, it is assumed that 240 ms or more is used as a scan-period condition. This means that if scanning is performed for one of the adjacent base stations at least using 240 ms, a highly reliable scan result is obtained.

Also, it is possible to use the scan-period condition as a scan-end condition. That is to say, for each of the adjacent base stations 31 to 34, it is possible to determine that scanning is terminated at a point in time when 240 ms has passed from a start of scanning.

Further, as parameters for scanning, there are the number of scans and a scan period for one time, and these parameters are adjusted and determined in advance. For example, as scan parameters for the network 1, it is assumed that the number of scans is 12, and a scan period for one time including adjacent base stations 31 to 34 is 80 ms.

These parameter values are determined by the fact that there are four stations, namely, adjacent base stations 31 to 34 in a surrounding area of the serving base station 20 in the network 1, and the scan-period condition (scan-end condition) is 240 ms.

In order to terminate scanning, measurement is performed for each of the adjacent base stations 31 to 34 at least 240 ms. Accordingly, the scan period becomes 960 ms on the whole. However, how to divide 960 ms for performing scanning is determined by pre-adjustment between the wireless communication apparatus 10 and the serving base station 20.

For example, in the above, the number of scans is set to 12, and a scan period for one time is set to 80 ms, thereby dividing 960 ms (960 ms=12×80 ms). However, the scan period may be set to 16, and the scan period for one time may be set to 60 ms, thereby dividing 960 ms (960 ms=16×60 ms).

In this regard, a radio-wave quality to be measured is assumed to be a CINR (Carrier to Interference and Noise Ratio). The CINR indicates a lowness of a noise of a radio wave, and the higher the value of the CINR is, the better the radio-wave quality is.

Figure 3:
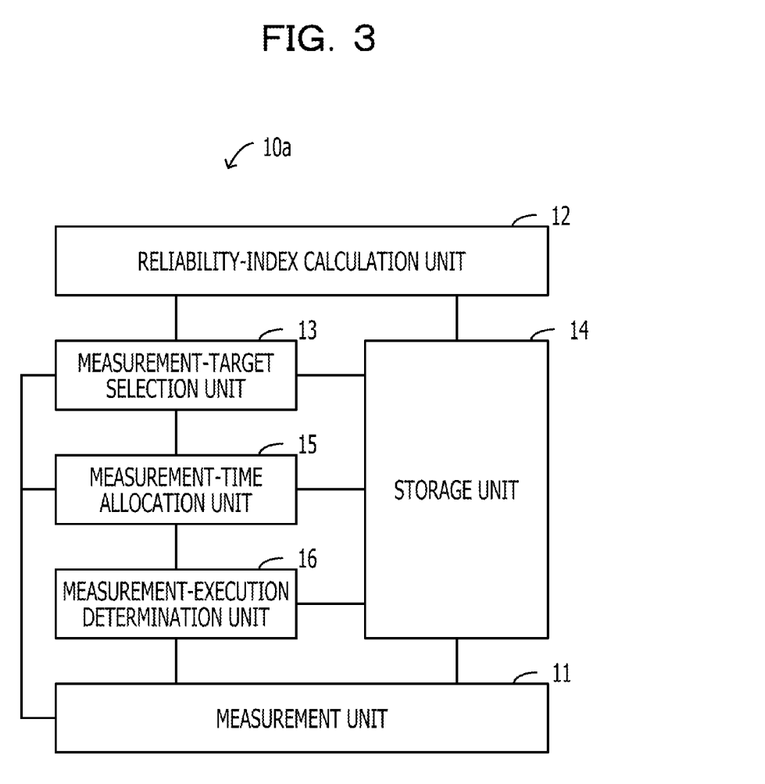
FIG. 3 is a diagram illustrating a configuration of a wireless communication apparatus.

Next, a description will be given of a configuration of the wireless communication apparatus 10. FIG. 3 is a diagram illustrating a configuration of the wireless communication apparatus. A wireless communication apparatus 10a includes a measurement unit 11, a reliability-index calculation unit 12, a measurement-target selection unit 13, a storage unit 14, a measurement-time allocation unit 15, and a measurement-execution determination unit 16.

The measurement unit 11 measures a radio-wave quality (CINR) of a measurement-target-candidate adjacent base station that is notified from the measurement-target selection unit 13. Also, if the measurement unit 11 is notified of a measurement time for each adjacent base station from the measurement-time allocation unit 15, the measurement unit 11 performs measurement in accordance with the notified measurement time. The measurement unit 11 notifies the measurement result of the CINR and the measurement time to the storage unit 14.

The storage unit 14 stores the measurement result and the measurement time that are notified from the measurement unit 11 for each adjacent base station. The measurement time is accumulated for each measurement, and is managed as accumulated measurement time. In this regard, an example of information storage in the storage unit 14 will be described in FIG. 4 later.

The reliability-index calculation unit 12 calculates an index (reliability index) indicating reliability of the measurement result for each adjacent base station using information, such as the measurement result and the accumulated measurement time, etc., that is managed by the storage unit 14. The reliability-index calculation unit 12 notifies the calculated reliability index to the measurement-target selection unit 13 and the measurement-time allocation unit 15.

The measurement-target selection unit 13 calculates an index (validity index) indicating a validity of a scan target for each adjacent base station from the measurement result managed by the storage unit 14 and the calculated reliability index, and determines an adjacent base station to be a target of the next measurement on the basis of the validity index. Also, the measurement-target selection unit 13 notifies the adjacent base stations that have become measurement targets to the measurement unit 11 and the measurement-time allocation unit 15, etc.

The measurement-time allocation unit 15 determines allocation of measurement time at the time of the next scan for the adjacent base stations that have become the measurement targets on the basis of the measurement result stored in the storage unit 14 and the reliability index. And the measurement-time allocation unit 15 allocates measurement time to each measurement target base station on the basis of the determined allocation. Also, the measurement-time allocation unit 15 notifies the allocated measurement time to the measurement unit 11 and the measurement-execution determination unit 16.

The measurement-execution determination unit 16 determines how a relative evaluation of the validity index for each adjacent base station to be measured changes. If determined that the relative evaluation will not be changed for the next measurement, the measurement-execution determination unit 16 terminates the measurement of the CINR (a description will be given of specific operation of the measurement-execution determination unit 16 later).

Figure 4:
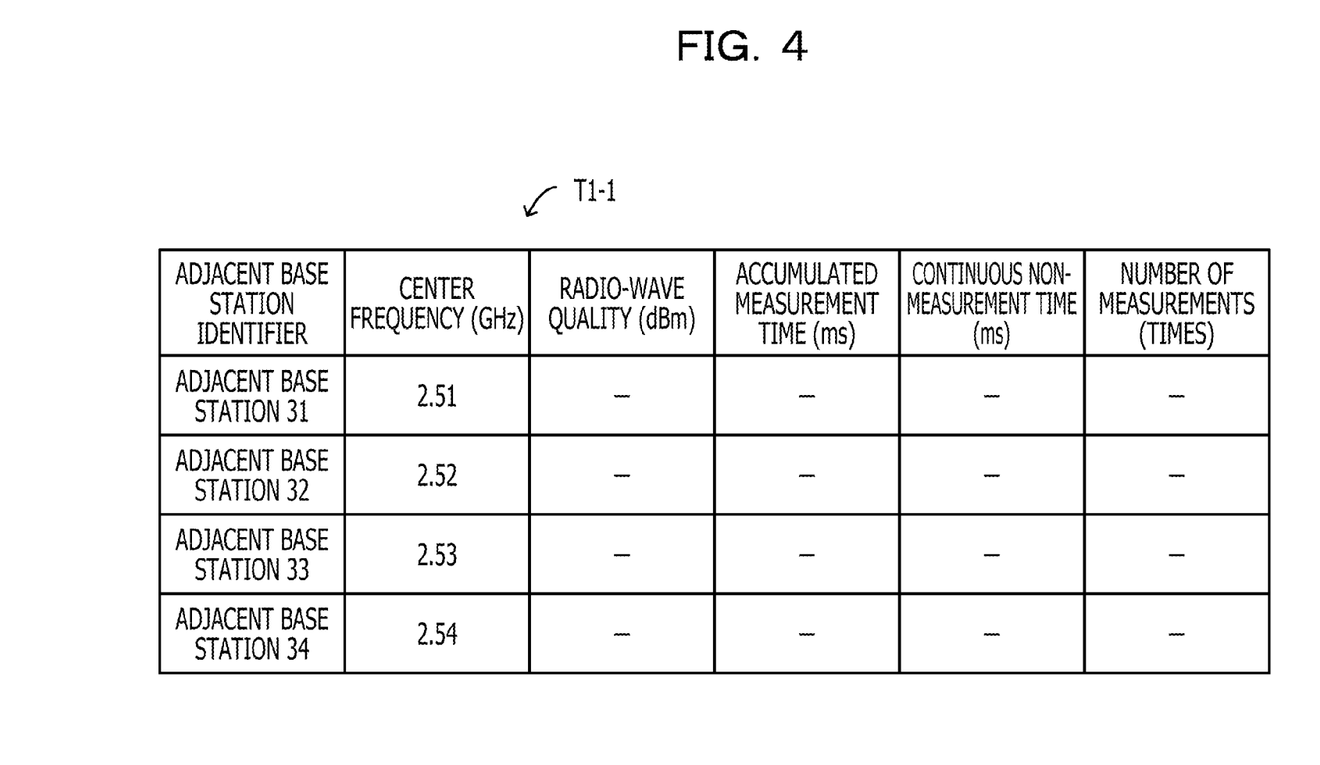
FIG. 4 is a management table managed by a storage unit.

FIG. 4 is a diagram illustrating a management table managed by the storage unit 14. The storage unit 14 has an identifier of an adjacent base station, a center frequency (GHz), a radio-wave quality (dBm), accumulated measurement time (ms), continuous unmeasured time (ms), and a management table storing the number of measurements (times).

If it is assumed that center frequencies used by the adjacent base stations 31 to 34 for communication are 2.51 GHz, 2.52 GHz, 2.53 GHz, and 2.54 GHz, respectively, values of these center frequencies are stored in the management table T1-1 for each of the adjacent base stations 31 to 34. In this regard, the number of measurements and continuous time of unmeasured state (continuous unmeasured time) are also managed for each adjacent base station.

Next, a detailed description will be given of operation of the wireless communication apparatus 10*a*. When the wireless communication apparatus 10*a* performs first scanning, the wireless communication apparatus 10*a* allocates time equally to all of the adjacent base stations 31 to 34 to measure CINRs.

Specifically, the number of scans for each one adjacent base station is 12, and thus the scanning is performed 48 times for the adjacent base stations 31 to 34 in total while the total scan period is 960 ms. Accordingly, in order to equally allocate time, a scan period of one scan for one adjacent base station becomes 20 ms (=960 ms÷48).

The wireless communication apparatus 10*a* performs scanning on each of the adjacent base stations 31 to 34 for 20 ms, and stores the accumulated measurement times at this time and the obtained CINRs in the management table.

Figure 5:
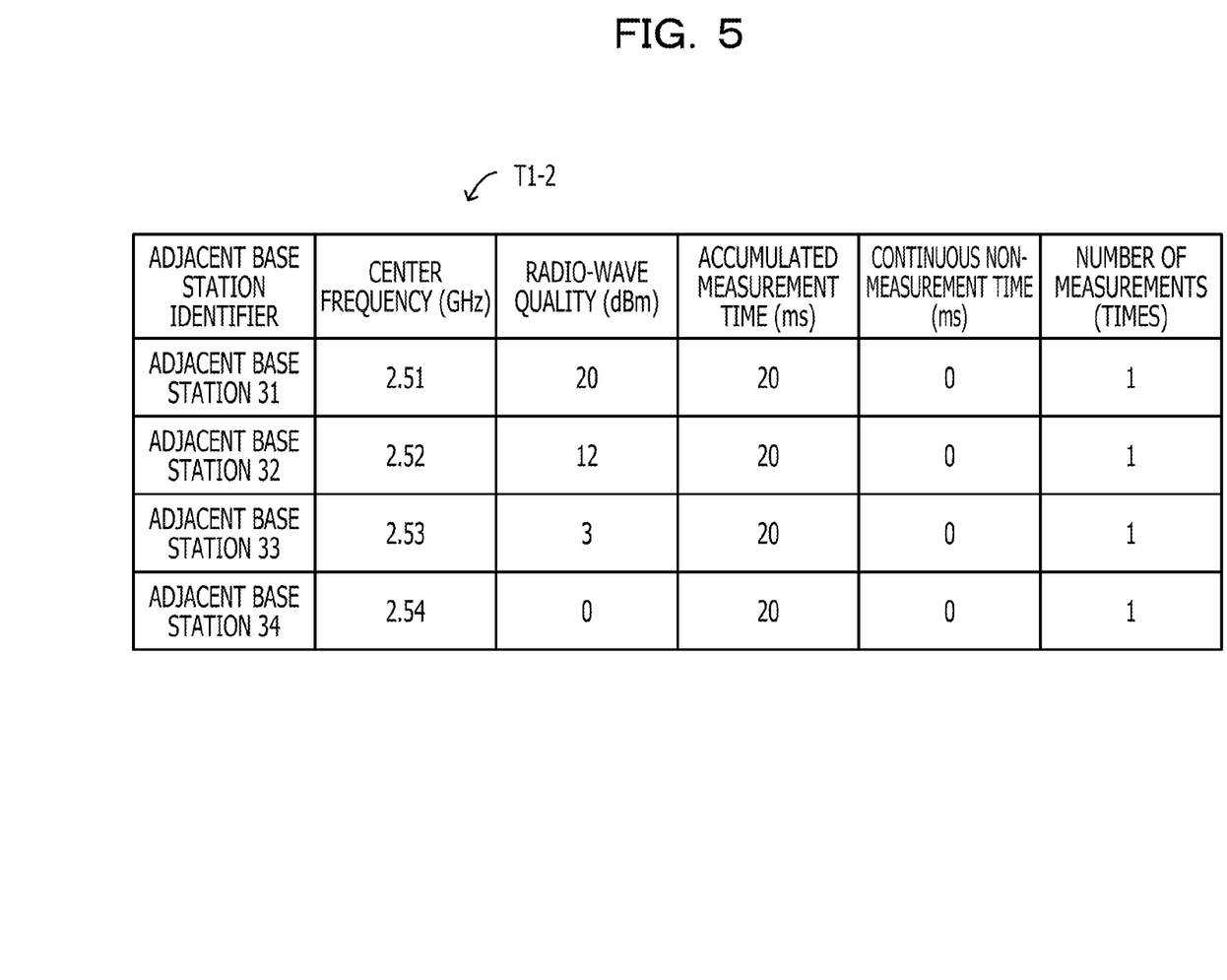
FIG. 5 is a management table illustrating registration state.

FIG. 5 is a diagram illustrating a registration state in the management table. A management table T1-2 illustrates a registration state in which individual parameter values at the time of first scan have been added. The accumulated measurement times for the adjacent base stations 31 to 34 are 20 ms, respectively, because of the first scan.

Also, it is assumed that the CINRs of the adjacent base stations 31 to 34 have been measured as 20 dBm, 12 dBm, 3 dBm, and 0 dBm, respectively, and these values are stored. In this regard, 1 is recorded in the numbers of measurements.

Next, a second scan is performed. From the second scan operation, control is performed so that a candidate having a low possibility of becoming a target base station is dropped out of the adjacent base stations 31 to 34, and a candidate having a high possibility of becoming a target base station is selected.

However, as an index for the selection, it is not desirable to select a candidate only by the obtained CINR value at the first scan. Because that value is a radio-wave quality of the CINR obtained only by the measurement time of 20 ms, and thus the measured value alone is not exactly highly reliable.

Accordingly, the wireless communication apparatus 10*a* uses not only the measured CINRs but also reliability indexes indicating the reliabilities of the measurement results as a determination factor of selecting a base station.

The reliability-index calculation unit 12 calculates a measurement error width as a reliability index. The measurement error width is defined by the following expression (1).

The measurement error width=the remaining measurement time×the measurement error width for each unit time (1)

In this example, a scan is stopped when the accumulated measurement time becomes 240 ms, and thus the remaining measurement time becomes (240−the accumulated-measurement time at the current stage). Also, if the measurement error width for each unit time is set to, for example, 0.05 dBm, Expression (1) becomes Expression (1a).

The measurement error width=(240−the accumulated-measurement time at the current stage)×0.05 (1a)

Here, this is a second scan, and thus the accumulated-measurement time at the current stage is 20 ms. Accordingly, from Expression (1a), each measurement error width of the adjacent base stations 31 to 34 is calculated as 11 dBm (=(240−20)×0.05).

Here, descriptions will be given of the following cases (A1) to (A4) as variations for calculating the measurement error width.

(A1) In the calculation of the measurement error width, the number of measurements is considered. The calculation expression of the measurement error width in consideration of the number of measurements becomes Expression (2).

The measurement error width=the remaining measurement time×the measurement error width for each unit time−the remaining number of measurements×a measurement error for each one measurement (2)

In this regard, the scan period for one adjacent base station is 240 ms, and the number of scans is 12, and thus Expression (2) can be written as Expression (2a).

The measurement error width=(240−the accumulated-measurement time at the current stage)×the measurement error width for each unit time−(12−the number of measurements)×a measurement error for each one measurement (2a)

The smaller the number of measurements is, the lower the reliability becomes, and the larger the number of measurements is, the higher the reliability becomes. Accordingly, by calculating the measurement error width using Expression (2), it is possible to obtain a measurement error width on which a reliability changing with the number of measurements is reflected.

(A2) In the calculation of the measurement error width, a continuous unmeasured time is considered. The calculation expression of the measurement error width in consideration of the continuous unmeasured time becomes Expression (3).

The measurement error width=(the remaining measurement time+the continuous unmeasured time)×the measurement error width for each unit time (3)

The longer the continuous unmeasured time, which is a time period of continuous unmeasured state for the adjacent base stations, the lower the reliability becomes, and the shorter the continuous unmeasured time is, the higher the reliability becomes. Accordingly, by calculating the measurement error width using Expression (3), it is possible to obtain a measurement error width on which a reliability changing with the continuous unmeasured time is reflected.

(A3) In the calculation of the measurement error width, a moving speed of the wireless communication apparatus 10*a* is considered. The calculation expression of the measurement error width in consideration of the moving speed becomes Expression (4).

The measurement error width=the remaining measurement time×the measurement error width for each unit time×the moving speed×the measurement error width for each unit speed (4)

The higher the moving speed of the wireless communication apparatus 10*a* is, the lower the reliability becomes, and the lower the moving speed is, the higher the reliability becomes. Accordingly, by calculating the measurement error width using Expression (4), it is possible to obtain a measurement error width on which a reliability changing with the moving speed is reflected.

(A4) In the calculation of the measurement error width, the variance of the CINRs is considered. The calculation expression of the measurement error width in consideration of the variance of the CINRs becomes Expression (5).

The measurement error width=the remaining measurement time×the measurement error width for each unit time×the variance×the measurement error width for each unit variance (5)

Here, it is assumed that at the time of measuring CINRs, for example, a measured value of the CINR at a first time is 30 dBm, a measured value at a second time is 15 dBm, a measured value at a third time is 45 dBm, and a measured value at a fourth time is 7 dBm.

In this manner, if there are large variations in the measured value, it is thought that variations of propagation environment, such as blocking of radio waves by an obstacle are large, and such variations of the measured value can be expressed by the variance. When the variance is large, radio waves are blocked by an obstacle, and the like, and thus it is regarded that correct measurement is not allowed, resulting in a low reliability. If the variations are small, the reliability becomes high.

Accordingly, in the case where variations of a propagation environment are significant in this manner, it is possible to obtain a measurement error width on which a reliability changing with the variance of the CINRs is reflected by calculating the measurement error width using Expression (5).

Next, a description will be given of processing calculating a measurement error (validity index) from the measurement error width (reliability index). The measurement-target selection unit 13 calculates the measurement error of the CINRs from the CINR values and the above-described measurement error width (reliability index). The measurement error is used as an index (validity index) indicating a validity of each of the adjacent base stations 31 to 34 as a scan target. The measurement error is a value produced by adding or subtracting the value of the measurement error width to or from the CINR value.

For the adjacent base station 31, the CINR is 20 dBm, and the measurement error width is 11 dBm, and thus the measurement error becomes 9 to 31 (=20±11) dBm. For the adjacent base station 32, the CINR is 12 dBm, and the measurement error width is 11 dBm, and thus the measurement error becomes 1 to 23 (=12±11) dBm.

Also, for the adjacent base station 33, the CINR is 3 dBm, and the measurement error width is 11 dBm, and the measurement error becomes −8 to 14 (=3±11) dBm. For the adjacent base station 34, the CINR is 0 dBm, and the measurement error width is 11 dBm, and thus the measurement error becomes −11 to 11 (=0±11) dBm.

Figure 6:
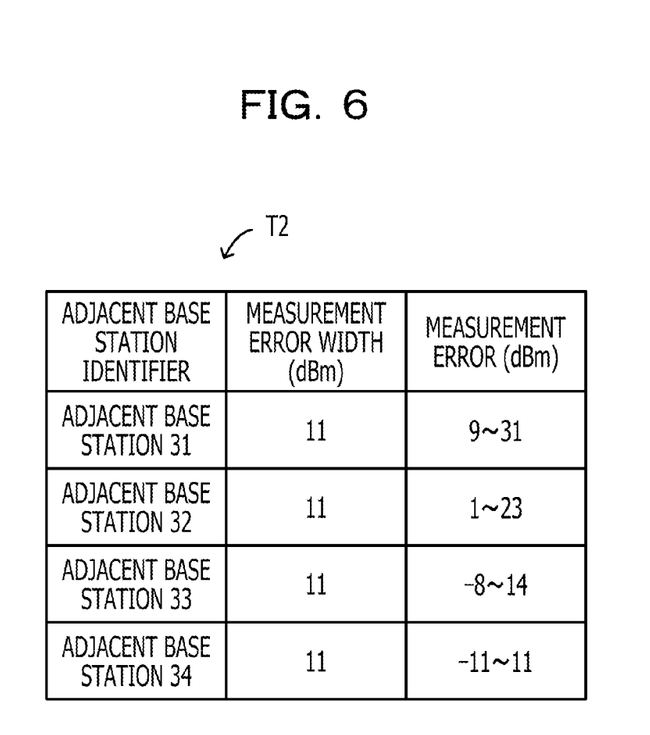
FIG. 6 is a table illustrating calculation results of a measurement error width and a measurement error.

FIG. 6 is a diagram illustrating calculation results of a measurement error width and a measurement error. The storage unit 14 performs registration control of the measurement error width (dBm) of the CINR and the measurement error (dBm) of the CINR on each of the adjacent base stations 31 to 34 by a management table T2. The management table T2 in FIG. 6 stores resultant values that are calculated as described above.

The measurement-target selection unit 13 determines an adjacent base station to be measured using the measurement error of the CINR. For a determination method, for example, it is possible to obtain a reference value to be a candidate of the handover destination from the serving base station 20 in advance, and then to determine a measurement target using the following methods (a) to (c).

(a) When a measured CINR value is higher than the reference value, an adjacent base station having the CINR value is determined to be a measurement target.

(b) When a measured CINR value is not higher than the reference value, if a measurement error is higher than the reference value, an adjacent base station having the CINR value is determined to be a measurement target.

(c) When a measured CINR value is not higher than the reference value, if a measurement error is not higher than the reference value, an adjacent base station having the CINR value is excluded from measurement targets.

For example, it is assumed that a reference as a candidate of a handover destination is "the CINR is 15 dBm or more". In this case, a determination is made of whether the adjacent base stations 31 to 34 will be measurement targets or not using the above-described conditions (a) to (c) by referring to the management tables T1-2 and T2, which are illustrated in FIG. 5 and FIG. 6, respectively.

For the adjacent base station 31, the CINR of the adjacent base station 31 is 20 dBm, which is higher than the reference value 15 dBm, and thus the adjacent base station 31 is selected as a measurement target of the next scan.

For the adjacent base station 32, the CINR of the adjacent base station 32 is 12 dBm, but the measurement error is from 1 to 23 dBm. Since the maximum value of the measurement error is 23 dBm, the measurement error is higher than the reference value 15 dBm. Accordingly, the adjacent base station 32 is selected as a measurement target of the next scan.

For the adjacent base station 33, the CINR of the adjacent base station 33 is 3 dBm, and the measurement error is from −8 to 14 dBm. Since the maximum value of the measurement error is 14 dBm, which is not higher than the reference value 15 dBm, the adjacent base station 32 is not selected as a measurement target.

For adjacent base station 34, the CINR of the adjacent base station 34 is 0 dBm, the measurement error is from −11 to 11 dBm. Since the maximum value of the measurement error is 11 dBm, which is not higher than the reference value 15 dBm, the adjacent base station 34 is not selected as a measurement target.

Accordingly, the measurement-target selection unit 13 selects the adjacent base stations 31 and 32 as measurement targets, and drops the adjacent base stations 33 and 34 from the candidates of the measurement target.

Here, descriptions will be given of variations (B1) to (B4) as determination mechanisms for selecting a candidate of the measurement target in addition to the above-described determination mechanisms (a) to (c).

(B1) In the above, an adjacent base station having a measurement error higher than the reference value (15 dBm) is selected as a measurement target candidate at the time of the next scan. However, adjacent base stations having high CINRs in consideration of the measurement error are selected without using the reference value (for example, three adjacent base stations having higher CINRs are selected).

(B2) A selection is made to narrow the scan targets only to an adjacent base station having a highest CINR value in consideration of the measurement.

(B3) Determination methods are dynamically changed in accordance with the CINR of the serving base station 20. For example, the case where the wireless communication apparatus 10a is located at a service-area boundary of the serving base station 20 is thought.

It is assumed that while the wireless communication apparatus 10a is performing mobile communication, a receiving value of the CINR of the serving base station 20 has become a lower value than a normal operation level. In this case, the wireless communication apparatus 10a can be assumed to be located in the vicinity of the service-area boundary of the serving base station 20, or the like. At this time, a margin of causing a communication service disconnection with the serving base station 20 is small (a small margin a risk of arising a communication service disconnection is high).

Accordingly, in order to avoid a communication service disconnection, it is desirable to perform a handover immediately. In such a situation, for example, a case in which any one of (a) to (c) is used for a determination mechanism at normal time is dynamically changed into a case of using the determination mechanism (B2) and determining a target base station quickly in order to perform a handover.

On the other hand, it is assumed that the receiving value of the CINR of the serving base station 20 is a normal operation level, the wireless communication apparatus 10a is located in a range in which a radio wave emitted from the serving base station 20 sufficiently reaches, and a margin of arising a communication service disconnection with the serving base station 20 is large (a large margin→a risk in arising a communication service disconnection is small).

In such a situation, there is a margin in time for carrying out a handover, and thus the determination mechanism is changed from the determination mechanism (B2) to a more accurate determination mechanisms (a) to (c). In this manner, by dynamically changing a determination mechanism in response to the CINR of the serving base station 20, it is possible to carry out a flexible handover while a communication service disconnection is avoided.

(B4) The determination mechanism is dynamically changed in accordance with a moving speed of the wireless communication apparatus 10a. The determination mechanism (B4) is based on a same idea as that of the determination mechanism (B3). That is to say, the higher the moving speed is, the higher the possibility of going out from a service area of the serving base station 20 is by that amount, and thus a handover has to be carried out in a short time.

Accordingly, in the case where the moving speed of the wireless communication apparatus 10a is high, for example, if one of the determination mechanisms (a) to (c) is used at normal time, the determination mechanism is dynamically changed to the determination mechanism (B2), and a target base station is determined quickly in order to perform a handover.

Also, in the case where the moving speed of the wireless communication apparatus 10a is not high, there is a margin in time for carrying out a handover, and thus the determination mechanism is changed from the determination mechanism (B2) to a more accurate determination mechanisms (a) to (c). In this manner, by dynamically changing a determination mechanism in response to the moving speed, it is possible to carry out a flexible handover while a communication service disconnection is avoided.

As described above, selection control of a base station candidate is performed, and after that, the measurement unit 11 individually performs a second scan on the adjacent base station 31 and the adjacent base station 32. Also, in this case, the measurement-time allocation unit 15 allocates, for example, a measurement time of 40 ms to each of the base stations.

That is to say, a measurement time of 20 ms, which is scheduled to be individually used for the adjacent base stations 33 and 34 excluded from the measurement targets, is allocated to the adjacent base stations 31 and 32 to be measured, and the measurement time of the adjacent base stations 31 and 32 is determined to be 40 ms.

As described above, the wireless communication apparatus 10a selects the adjacent base stations 31 and 32 having a high possibility of becoming the target base stations from the adjacent base stations 31 to 34 on the basis of the validity index.

And the measurement time that has been allocated to the adjacent base stations 33 and 34 excluded from the measurement target candidates is allocated to the measurement-target adjacent base stations 31 and 32, and then scanning is performed on the adjacent base stations 31 and 32 using the increased measurement time.

Thereby, the target base stations are narrowed to adjacent base stations having a high possibility of being target base stations, and thus scanning is performed by efficiently allocating measurement time. Accordingly, it becomes possible to quickly meet the scan-period condition, and to determine a target base station in a short time and with high reliability.

Figure 7:
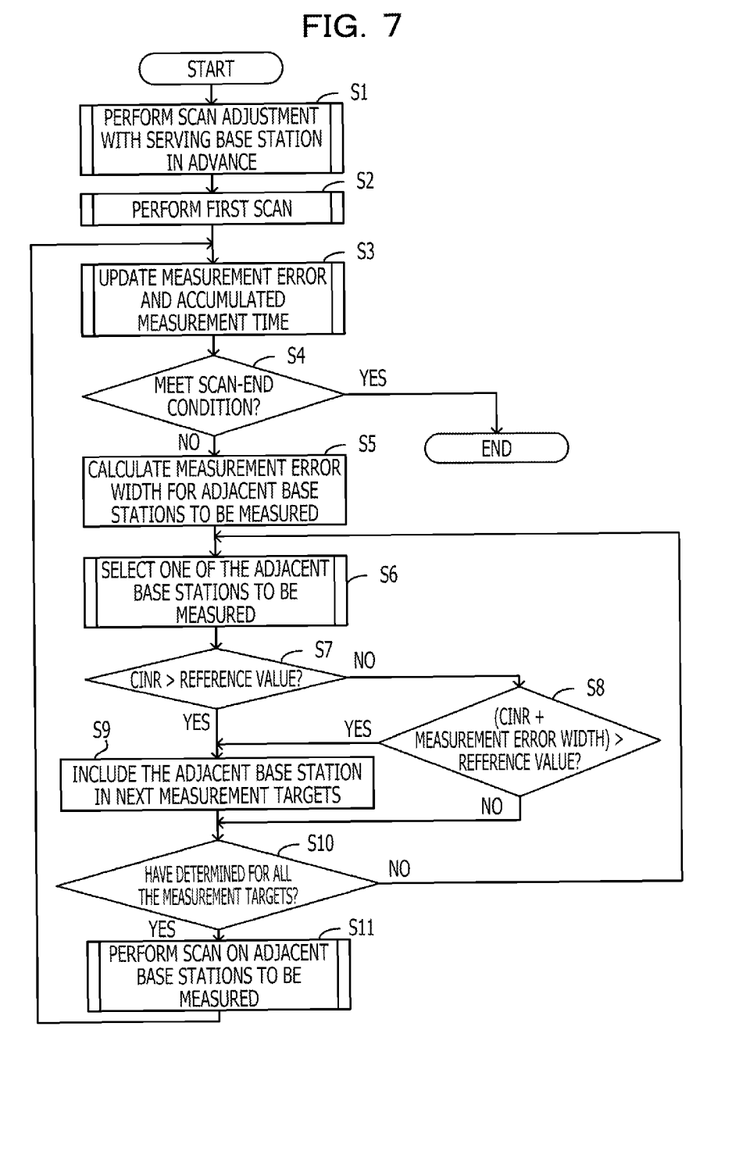
FIG. 7 is a flowchart illustrating an operation.

Next, a description will be given of the above-described operation using a flowchart. FIG. 7 is a flowchart illustrating the operation.

(S1) The wireless communication apparatus 10a performs pre-adjustment of the scanning on the serving base station 20.

(S2) The wireless communication apparatus 10a performs a first scan.

(S3) The measurement-target selection unit 13 updates the measurement result and the accumulated measurement time.

(S4) The measurement-target selection unit 13 determines whether or not the accumulated measurement time meets the scan-end condition for all the measurement-target adjacent base stations. If the end condition is met, the processing is terminated, whereas if not, the processing proceeds to step S5.

(S5) The reliability-index calculation unit 12 calculates the measurement error widths (reliability indexes) of all the measurement-target adjacent base stations.

(S6) The measurement-target selection unit 13 selects one adjacent base station from the adjacent base stations to be measured.

(S7) The measurement-target selection unit 13 determines whether or not the CINR of the selected adjacent base station is higher than a reference value to be a candidate of the handover destination. If higher, the processing proceeds to step S9, whereas if not higher, the processing proceeds to step S8.

(S8) The measurement-target selection unit 13 obtains a measurement error (validity index), which is the sum of the CINR and the measurement error width (reliability index), and determines whether a maximum value of the measurement error is higher than a reference value to be a candidate of the handover destination. If it is higher, the processing proceeds to step S9, whereas if not higher, the processing proceed to step S10.

(S9) The measurement-target selection unit 13 includes the adjacent base station in the next measurement targets.

(S10) The measurement-target selection unit 13 determines whether processing in steps S7 and S8 has been performed for all the adjacent base stations to be measured or not. If performed for all the adjacent base stations, the processing proceeds to step S11. If not performed for all the adjacent base stations, the processing returns to step S6.

(S11) The measurement unit 11 performs scanning on the selected adjacent base stations to be measured.

Next, a description will be given of allocation control of measurement time. When candidates of adjacent base stations to be scanned are selected, the measurement-time allocation unit 15 controls to adaptively allocate measurement time to the adjacent base stations.

Here, the scan period is 80 ms for the adjacent base stations 31 and 32 determined to be the measurement targets by the measurement-target selection unit 13. In the above, 40 ms are allocated equally. For a method of allocation, this time may be allocated, for example, by proportional allocation in accordance with the CINRs.

The CINR of the adjacent base station 31 is 20 dBm, and the CINR of the adjacent base station 32 is 12 dBm from the management table T1-2 illustrated in FIG. 5. Accordingly, the measurement time is proportionally allocated to the adjacent base stations 31 and 32 in the ratio of 5:3.

That is to say, the measurement time of the adjacent base station 31 becomes 50 ms (=(20/(20+12))×80), and the measurement time of the adjacent base station 32 becomes 30 ms (=(12/(20+12))×80).

In this manner, when candidates of the adjacent base stations to be scanned are selected, proportional allocation in accordance with the CINRs is performed on the selected adjacent base stations. By allocating measurement time in such a way, it becomes possible to obtain a highly reliable measurement result for adjacent base stations having a high possibility of becoming the target base stations in a short time.

Figure 8A:
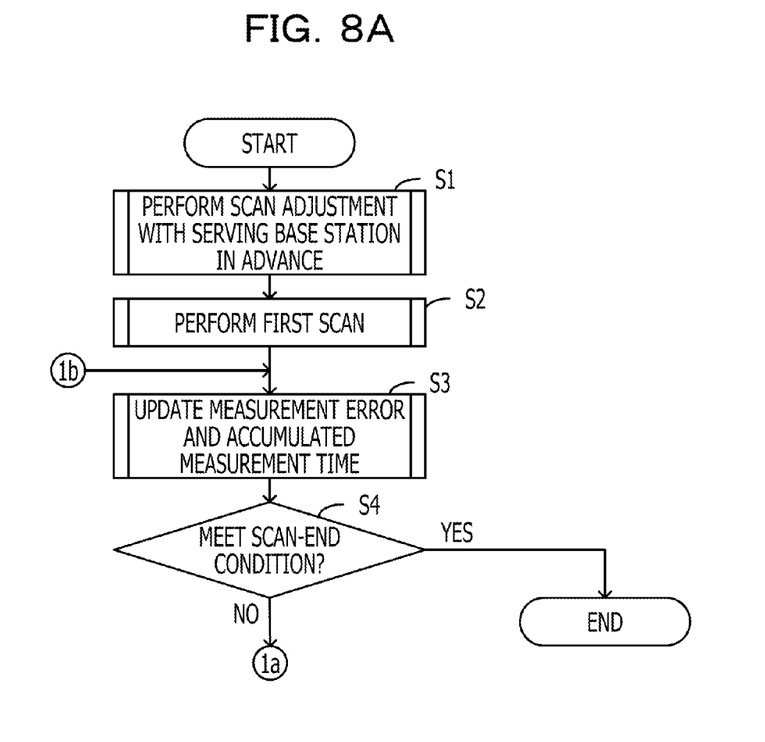
FIG. 8A is a flowchart illustrating an operation.
Figure 8B:
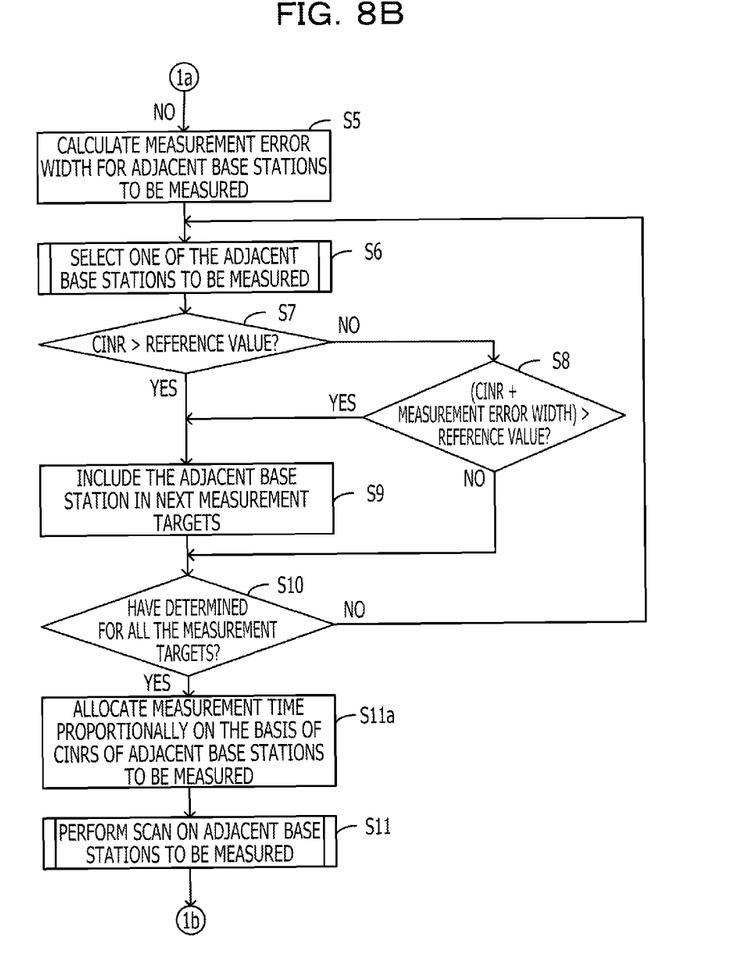
FIG. 8B is a flowchart illustrating an operation.

FIG. 8A and FIG. 8B are flowcharts illustrating operation. Between step S10 and step S11 of the operation flowchart illustrated in FIG. 7, step S11a is inserted in which the measurement-time allocation unit 15 performs proportional allocation processing of the measurement time in accordance with the CINR value. The other operation is the same as that in FIG. 7, and thus the description thereof will be omitted.

In this regard, as a variation in addition to the proportional allocation processing in accordance with the CINRs, for example, a fixed ratio may be set in advance for a plurality of adjacent base stations having high CINR values, and measurement time may be allocated accordingly.

For example, for a measurement time of 80 ms, the ratio of 50 ms, 20 ms, and 10 ms may be fixedly set, for example, 50 ms is allocated to an adjacent base station having a highest CINR value, 20 ms is allocated to a second highest CINR value, and 10 ms is allocated to a third highest adjacent base station.

Also, it is possible to allocate all the measurement time to an adjacent base station having a highest CINR value. For example, when the adjacent base station 31 has a highest CINR value, and a handover has to be carried out immediately, 80 ms may be entirely allocated to the adjacent base station 31. In this regard, in the above, allocation is carried out on the basis of the CINR value, but in place of the CINR value, allocation may be carried out on the basis of the measurement error in the same manner as described above.

Figure 9:
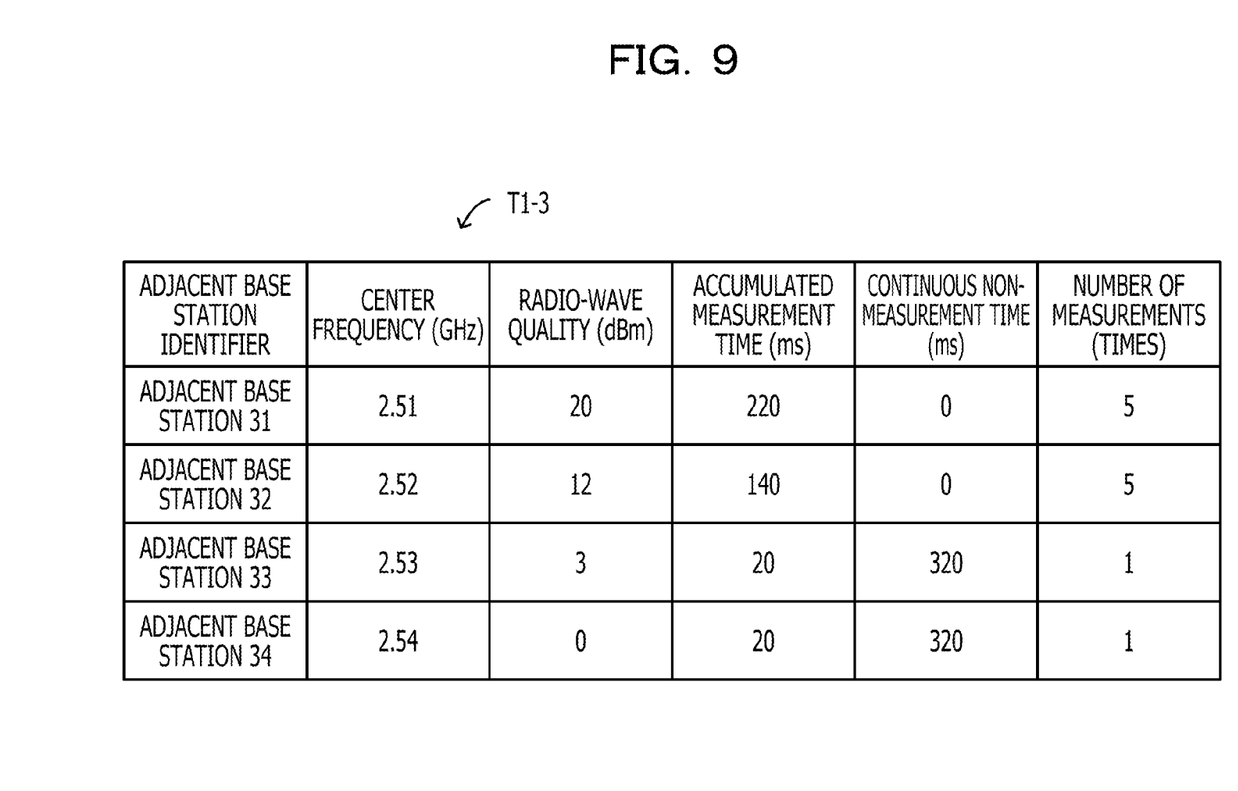
FIG. 9 is a management table illustrating registration state.

Next, a description will be given of control in the case where allocated measurement time exceeds the scan-end time. FIG. 9 is a diagram illustrating a registration state in the management table. It is assumed that adjacent base stations 31 and 32 are selected for the measurement target, the current measurement state has registration contents as illustrated in FIG. 9. Now, the accumulated measurement time of the adjacent base station 31 is 220 ms, and the accumulated measurement time of the adjacent base station 32 is 140 ms.

If it is assumed that a measurement time of 40 ms is individually allocated to the adjacent base stations 31 and 32 at the next scan, the accumulated measurement time of the adjacent base station 31 becomes 260 ms, and the accumulated measurement time of the adjacent base station 32 becomes 180 ms. At this time, the accumulated measurement time of the adjacent base station 31 exceeds 240 ms, which is a scan-end condition obtained by the pre-adjustment.

Accordingly, in such a case, the measurement-time allocation unit 15 re-allocates the excess time (20 ms) to the adjacent base station 32. By performing such re-allocation, it becomes possible to utilize the excess time exceeding the scan condition.

Next, a description will be given of operation of the measurement-execution determination unit 16. The measurement-execution determination unit 16 determines whether a relative evaluation of a validity index for each adjacent base station to be measured changes or not. And if determined that the relative evaluation does not change for the next measurement, the scan is terminated.

That is to say, if determined that the order of high-ranking measurement-target candidates and low-ranking measurement-target candidates is not reversed in ranking when the scan is continued, control is performed to terminate the scan at that point in time. In the following, a specific description will be given.

Figure 10:
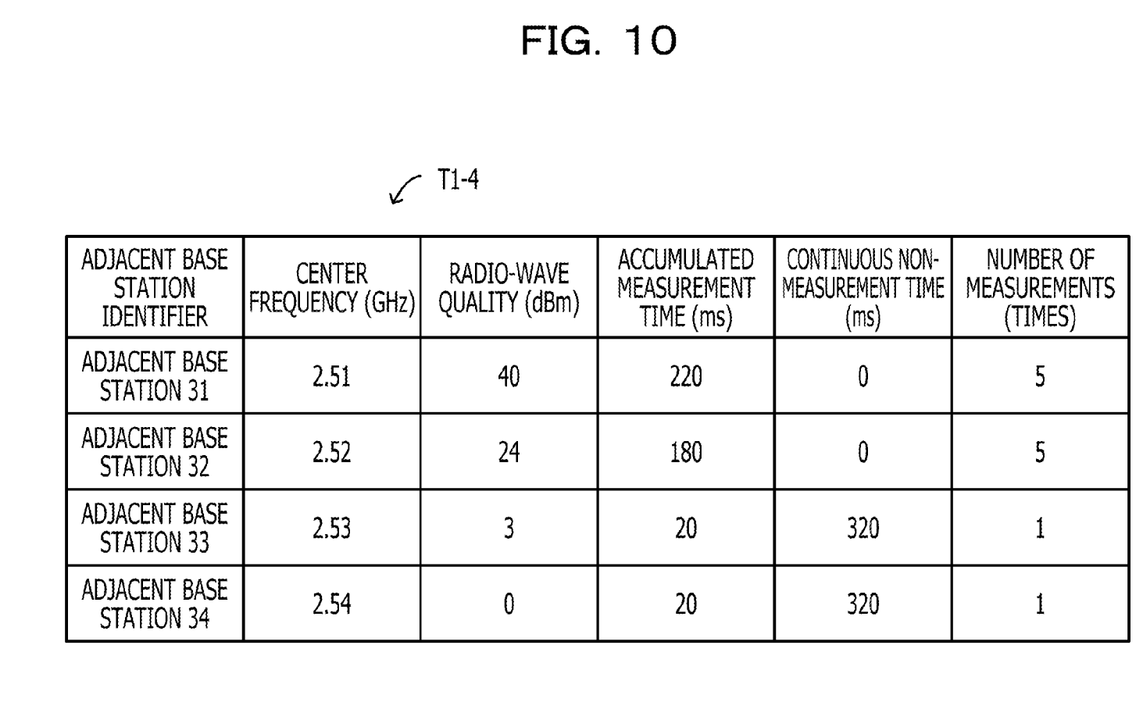
FIG. 10 is a management table illustrating registration state.

FIG. 10 is a diagram illustrating a registration state in the management table. The measurement error width and the measurement error of the adjacent base stations 31 and 32 are obtained from the registration contents of the management table T1-4.

For the adjacent base station 31, the accumulated measurement time is 220 ms, and thus the measurement error width becomes 1 ms (=(240−220)×0.05). Also, the CINR is 40 dBm, and thus the measurement error becomes 39 to 41 (=40±1) dBm.

For the adjacent base station 32, the accumulated measurement time is 180 ms, and thus the measurement error width becomes 3 ms (=(240−180)×0.05). Also, the CINR is 24 dBm, and thus the measurement error becomes 21 to 27 (=24±3) dBm.

Here, a minimum value (worst value) of the measurement error of the adjacent base station 31 is 39 dBm, and a maximum value (best value) of the measurement error of the adjacent base station 32 is 27 dBm. Accordingly, if the adjacent base stations 31 and 32 are the next measurement targets, at this point in time, it is understood that the CINR in consideration of the measurement error width of the adjacent base station 32 is not higher than the CINR in consideration of the measurement error width of the adjacent base station 31 (because (the best value of the adjacent base station 32, 27 dBm)<(the worst value of the adjacent base station 31, 39 dBm)).

In such a case, even if the accumulated measurement time is not greater than 240 ms, the scan is terminated and a target base station is determined immediately to carry out a handover (in this example, the adjacent base station 31 becomes the target base station).

In this manner, if determined that the high-ranking measurement target candidates and the low-ranking measurement target candidates will not be reversed in the order when the scan is continued, the scan is terminated. Thereby, it becomes possible to carry out a handover in a short time and with high precision.

As described above, when the wireless communication apparatus 10 performs scanning repeatedly, the wireless communication apparatus 10 determines whether target-base-station candidates are suited or not every time a scan is completed on the basis of the validity index calculated on the basis of the scan result of each of the adjacent base stations and the reliability index.

And an adjacent base station determined to be unsuitable is dropped from the subsequent scan targets, and the time scheduled to be allocated to the scanning of the adjacent base station excluded from the targets is allocated to scanning of the other adjacent base stations selected as the measurement candidates.

Thereby, it becomes possible to obtain a scan result in a short time with high precision (reliability). Accordingly, it becomes possible to determine whether to carry out a handover or not, and to select a target base station suitably in a short time. Further, the communication relay time with the serving base station 20 becomes short, and thus it becomes possible to greatly inhibit a decrease in the communication throughput, and to improve the communication quality.

In the above, the embodiments are exemplified. However, it is possible to replace a configuration of each part illustrated in the embodiments with another part having the same function. Also, any other structure or process may be added.

An example of a hardware configuration of each of the mobile stations is described as follows. A wireless interface (IF) is an interface device that is used to perform wireless communication with a base station. For example, a wireless interface is constructed by an antenna and analog circuits. A processor is a device that processes data. Examples of the processor are a central processing unit (CPU) and a digital signal processor (DSP). A memory is a device that stores data. Examples of the memory are a read only memory (ROM) and a random access memory (RAM). A digital circuit is an electronic circuit that performs a digital operation. Examples of the logical circuit are a large scale integration (LSI), a field-programming gate array (FPGA) and an application specific integrated circuit (ASIC).

Correspondence relationships between the mobile station 10 illustrated in FIG. 1 or the mobile station 10a illustrated in FIG. 3 and the hardware configuration are described as follows. The measurement unit 11, the reliability-index calculation unit 12, measurement-target selection unit 13, measurement-time allocation unit 15, and measurement-execution determination unit 16 correspond to the processor and the memory, for example. The storage unit 14 corresponds to the memory, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication apparatus comprising:
a wireless communication interface configured to receive radio waves; and
a processor configured to measure radio-wave qualities of the radio waves from a plurality of base stations in a periodic measurement period,
to divide one measurement period out of the periodic measurement period, and to measure radio-wave qualities of corresponding measurement-target base stations,
to determine a base station to be excluded from the corresponding measurement-target base stations in a next measurement period in the periodic measurement period on the basis of the radio-wave qualities, and
to allocate the measurement time period that has been allocated to the base station to be excluded in a measurement period to a measurement-target base station in the next measurement period.

2. The wireless communication apparatus according to claim 1, wherein the processor obtains reliability indexes on the corresponding radio-wave qualities of the corresponding measurement-target base stations on the basis of the radio-wave qualities, and determines the base station to be excluded on the basis of the reliability indexes.

3. The wireless communication apparatus according to claim 2, wherein the processor obtains the reliability indexes on the basis of accumulated measurement time of individual measurement-target base stations at a current stage.

4. The wireless communication apparatus according to claim 3, wherein the processor performs calculation using a moving speed of the terminal in addition at the time of obtaining the reliability indexes.

5. The wireless communication apparatus according to claim 3, wherein the processor performs calculation using a variance of the measurement values in addition at the time of obtaining the reliability indexes.

6. The wireless communication apparatus according to claim 3, wherein the processor performs calculation using a length of period of not measuring the radio-wave qualities in addition at the time of obtaining the reliability indexes.

7. The wireless communication apparatus according to claim 1, wherein if a measurement value of the radio-wave quality is higher than a reference value to be a candidate of a handover destination, the processor selects the base station having the radio-wave quality to be measured, and if a measurement value of the radio-wave quality is not higher than the reference value, the processor determines the base station to be excluded on the basis of the reliability index.

8. The wireless communication apparatus according to claim 1, wherein the processor dynamically changes a determination criterion of selecting a base station in accordance with the radio-wave quality of a belonging base station of the wireless communication apparatus.

9. The wireless communication apparatus according to claim 8, wherein the processor dynamically changes the determination criterion of selecting a base station on the basis of a margin of causing a communication disconnection with the belonging base station obtained on the basis of the radio-wave quality of the belonging base station.

10. The wireless communication apparatus according to claim 1, wherein the processor is further configured to determine whether or not a relative evaluation of a validity index change for each of the measurement-target base station, and if the processor determines that the relative evaluation does not change with respect to the next measurement, the processor terminates the measurement of the radio-wave quality.

11. A method of controlling in a wireless communication apparatus measuring radio-wave qualities of a plurality of base stations in a periodic measurement period, the method comprising:

dividing one measurement period out of the periodic measurement period, and measuring radio-wave qualities of corresponding measurement-target base stations;

determining a base station to be excluded from the corresponding measurement-target base stations in a next measurement period in the periodic measurement period on the basis of the radio-wave qualities; and allocating a measurement time period that has been allocated to the base station to be excluded in a measurement period to a measurement-target base station in the next measurement period.

* * * * *